(12) United States Patent
Menn (10) Patent No.: US 9,489,685 B2
(45) Date of Patent: Nov. 8, 2016

(54) VISUAL AND SPATIAL CONTROLS FOR PRIVACY SETTINGS IN A CHARITABLE GIVING APPLICATION

(71) Applicant: HOPELA INC., Seattle, WA (US)

(72) Inventor: Irina N. Menn, Bellevue, WA (US)

(73) Assignee: HOPELA INC., Bellevue, WA (US)

( * ) Notice: Subject to any disclaimer, the term of this patent is extended or adjusted under 35 U.S.C. 154(b) by 77 days.

(21) Appl. No.: 14/680,062

(22) Filed: Apr. 6, 2015

(65) Prior Publication Data

US 2015/0286836 A1 Oct. 8, 2015

Related U.S. Application Data

(60) Provisional application No. 61/975,533, filed on Apr. 4, 2014.

(51) Int. Cl.

| | |
|---|---|
| *H04L 29/06* | (2006.01) |
| *G06Q 30/02* | (2012.01) |
| *H04L 29/08* | (2006.01) |
| *G06F 21/62* | (2013.01) |
| G06F 7/04 | (2006.01) |
| G06F 17/30 | (2006.01) |
| H04N 7/16 | (2011.01) |

(52) U.S. Cl.
CPC ....... *G06Q 30/0279* (2013.01); *G06F 21/6245* (2013.01); *H04L 67/10* (2013.01); *G06F 2221/032* (2013.01)

(58) Field of Classification Search
None
See application file for complete search history.

(56) References Cited

U.S. PATENT DOCUMENTS

| | | | | |
|---|---|---|---|---|
| 7,000,108 | B1* | 2/2006 | Yarsa | G06F 9/4443 713/150 |
| 8,195,198 | B1* | 6/2012 | Shaw | H04W 48/04 455/456.1 |
| 8,464,161 | B2* | 6/2013 | Giles | G06F 21/604 345/419 |
| 8,832,567 | B1* | 9/2014 | Jing | G06F 3/0486 715/738 |
| 9,129,088 | B1* | 9/2015 | Baschy | G06F 21/10 |
| 2007/0113187 | A1* | 5/2007 | McMullen | G06F 21/6218 715/742 |
| 2012/0084689 | A1* | 4/2012 | Ledet | G06F 3/0486 715/769 |

\* cited by examiner

*Primary Examiner* — Shin-Hon Chen
(74) *Attorney, Agent, or Firm* — Christopher A. Wiklof; Launchpad IP, Inc.

(57) ABSTRACT

A graphical user interface includes objects for controlling privacy settings specific to particular user data corresponding to charitable giving. Graphically depicted sharing zones each represent a privacy setting. An information container represents particular user data. The user may drag and drop the information container between sharing zones to control privacy of the user data represented by the information container.

19 Claims, 5 Drawing Sheets

| | CONTAINER ID (402) | ZONE (404) | SHARE (406) | X-LOC (408) | Y-LOC (410) | GRAPH PROPS (412) | DATA (414) |
|---|---|---|---|---|---|---|---|
| 416 | 0001 | 104 | A | XXX | YYY | 10001 | 20001 |
| 418 | 0002 | 106 | A, B | XXX | YYY | 10002 | 20002 |
| 420 | 0003 | 106' | A, B' | XXX | YYY | 10003 | 20003 |
| 422 | 0004 | 108 | A, B, C | XXX | YYY | 1002 | 20004 |

400

VISUAL AND SPATIAL CONTROLS FOR PRIVACY SETTINGS IN A CHARITABLE GIVING APPLICATION

CROSS-REFERENCE TO RELATED APPLICATIONS

The present application claims priority benefit from U.S. Provisional Patent Application No. 61/975,533; entitled VISUAL AND SPATIAL CONTROLS FOR PRIVACY SETTINGS IN INFORMATION SYSTEMS"; filed Apr. 4, 2014; at the time of filing; which, to the extent not inconsistent with the description herein, is incorporated by reference.

The present application is related to U.S. Non-Provisional patent application Ser. No. 14/217,171; entitled "SYSTEM AND METHOD FOR MAKING A CONTEXT-SENSITIVE DONATION"; filed Mar. 17, 2014; copending at the time of filing; which, to the extent not inconsistent with the description herein, is incorporated by reference.

SUMMARY

According to embodiments, a visual-spatial controls interface and method for selecting information access settings in multi-user information systems, such as an information sharing system for a charitable giving computer application, are described herein.

According to an embodiment, a visual-spatial control system described herein can reduce or eliminate ambiguity in user privacy controls. In contrast, earlier systems may be typically characterized by extensive use of complex configuration options, content rules, dialog boxes, piecemeal control locations, etc. Such existing interfaces can be confusing to the user and/or difficult to access. Embodiments allow a user to be in full control of information sharing preferences through a visual-spatial control interface that provides a comprehensive interface for how data is shared within a system. For example, the system may include a mobile enterprise application with multiple user types that are allowed to interconnect within the system and be granted respective privileges for data access.

According to an embodiment, the visual-spatial controls system provides a method for controlling information sharing preferences in multi-user information systems through the use of visually identifiable information containers that can be dragged within or between visually and spatially distinct zones in the relational space of a user system profile. Embodiments allow users to visually inspect and manage the state of the information sharing settings for each information container.

Through an intuitive visual interface, embodiments allow a user to establish a level of public access to information available in his or her user profile by changing the position of information containers in a relational space represented in the user interface. Each container remains in a selected relational space until it is moved (e.g., dragged and dropped) by the user.

According to an embodiment, a method for selected sharing of charitable giving events across a network includes receiving charitable giving data corresponding to a charitable giving event into computer memory. Optionally, arbitrary data may be received and selectively shared as described herein. For example, a user can post photographs and use the graphical sharing/privacy tools described to select sharing. For ease of understanding, much of the description herein will focus on charitable giving data.

A computer processor can select container graphical properties corresponding to the charitable giving data and a first privacy zone identity from a plurality of privacy zones. The computer processor can assign sharing permission to the charitable giving data, the sharing permission corresponding to the first privacy zone. The computer processor selects a location within the first privacy zone for displaying the graphical container and writes data including the charitable giving data, the container graphical properties, the first privacy zone identity, and the location to a non-transitory computer-readable medium. The computer processor drives an electronic display to display, to a user, a plurality of privacy zones including the first privacy zone and the graphical container at the location within the first privacy zone, the graphical container being displayed according to the container graphical properties. At least a portion of the charitable giving data is transmitted for display on a second computing device associated with a second user only if the first sharing permission data allows transmission of the charitable giving data for viewing by the second user.

According to an embodiment, the method described above can be embodied as a non-transitory computer-readable medium carrying computer instructions configured to cause a computer to execute the method.

According to an embodiment, a method for setting sharing privileges for charitable giving events across a social network includes receiving charitable giving data corresponding to a charitable giving event into computer memory, selecting, with a computer processor, container graphical properties corresponding to the charitable giving data, the container graphical properties corresponding to a depiction of a graphical container representing the charitable giving event, and selecting, with the computer processor, a first privacy zone identity from a plurality of privacy zones. The computer processor can assign first sharing permission to the charitable giving data, the first sharing permission corresponding to the first privacy zone. The computer processor can select a first location within the first privacy zone, the first location corresponding to a display location of the graphical container. The computer processor writes data including the container graphical properties, the first privacy zone identity, and the first location to a non-transitory computer-readable medium (e.g., as a display list). The computer processor can receive a request, via a network interface, for data corresponding to a permissions control screen from a user device and responsively, via the network interface, data including the first graphical container properties, first privacy zone identity and first location (e.g., as a display list) for display on the user device. The computer processor can receive, via the network interface, data corresponding to a user-selected change in the location of the graphical container to a second location within a second privacy zone, write the second location to the non-transitory computer readable medium, and assign second sharing permission to the charitable giving data, the second sharing permission corresponding to the second privacy zone.

According to an embodiment, a non-transitory computer-readable medium carries computer instructions configured to cause a computer to execute a method for selected sharing of charitable giving events across a social network, the method comprising the steps of receiving charitable giving data corresponding to a charitable giving event into computer memory; selecting container graphical properties corresponding to the charitable giving data, the container graphical properties corresponding to a depiction of a graphical container representing the charitable giving event; selecting a first privacy zone identity from a plurality of privacy zones; and assigning first sharing permission to the charitable giving data, the first sharing permission corresponding to the first privacy zone. The instructions further cause the computer processor to select a first location within the first privacy zone, the first location corresponding to a display location of the graphical container and write data including the container graphical properties, the first privacy zone identity, and the first location to a non-transitory computer-readable medium (as a display list). The computer processor can receive a request, via a network interface, for data corresponding to a permissions control screen from a user device. The instructions further cause the computer processor to output, via the network interface, data including the first graphical container properties, first privacy zone identity and first location (as a display list) for display on the user device; receive, via the network interface, data corresponding to a user-selected change in the location of the graphical container to a second location within a second privacy zone; and write the second location to the non-transitory computer readable medium. The instructions can further cause the computer processor to assign second sharing permission to the charitable giving data, the second sharing permission corresponding to the second privacy zone.

According to an embodiment, a non-transitory computer readable medium carries a data structure, the data structure comprising charitable giving data corresponding to a charitable giving event; container graphical properties selected to cause a graphical container to be displayed on a user device, the graphical container being intended to represent the charitable giving event; a privacy zone identity, the privacy zone corresponding to a displayed region on the user device, the displayed region being intended to represent a corresponding sharing privilege setting, the corresponding sharing privilege setting being intended to determine one or more identities of login credentials having access to the charitable giving data; and a location in the privacy zone selected as a display location of the graphical container.

According to an embodiment, a non-transitory computer readable medium carries computer executable instructions configured to present a graphical user interface, the graphical user interface comprising a plurality of graphically depicted sharing zones, each graphically depicted sharing zone corresponding to a privacy setting and one or more graphically depicted information containers, each graphically depicted information container representing a particular set of user data. Each graphically depicted information container is configured to be displayed in one of the graphically depicted sharing zones and to be moved between two or more of the plurality of graphically depicted sharing zones. The particular set of user data represented by the graphically depicted information container is visible to other users according to the privacy setting corresponding to the graphically depicted sharing zone in which the graphically depicted information container is disposed.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
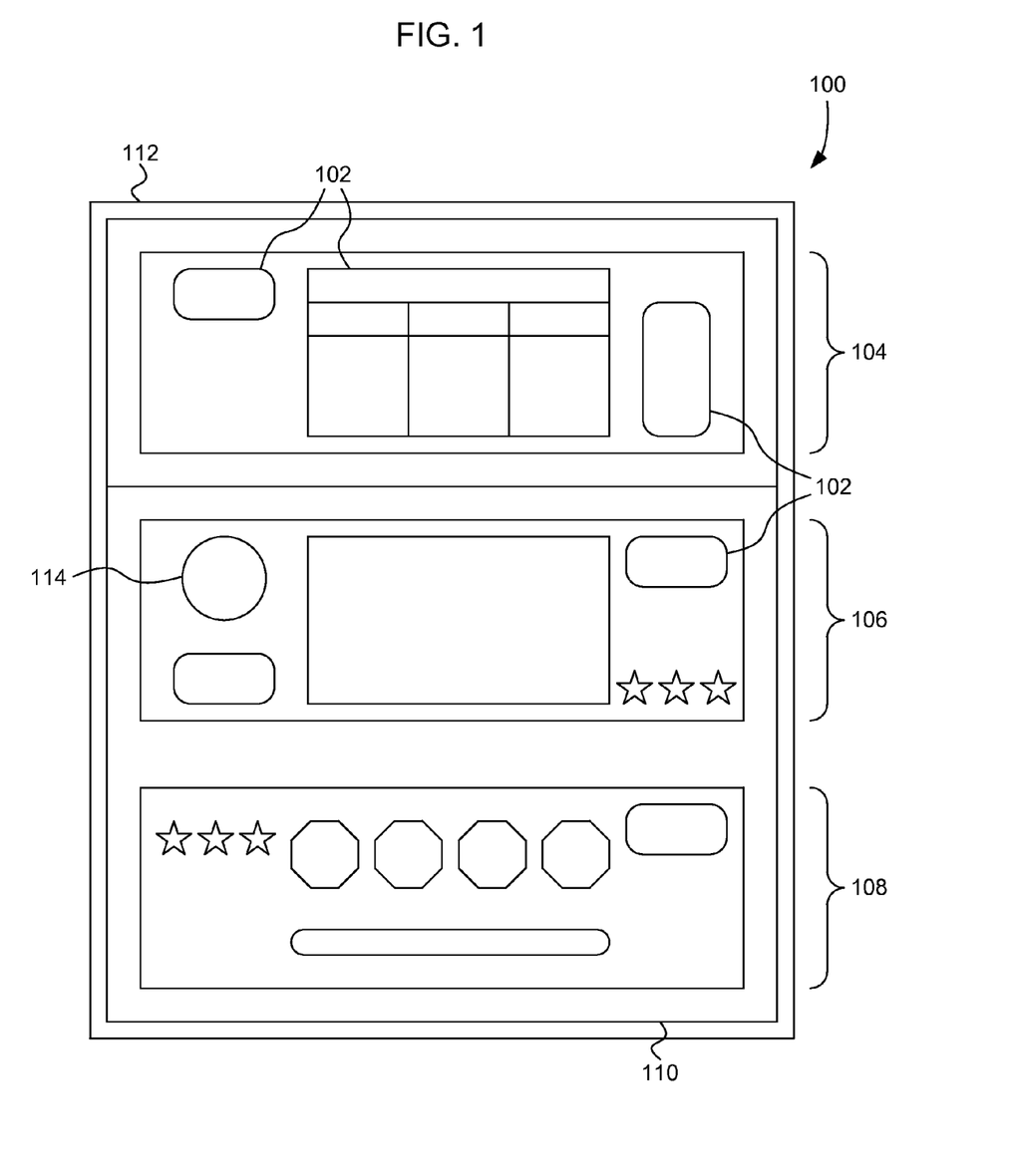
FIG. 1 is a diagram of a graphical user interface (GUI) for a user profile including a plurality of information containers disposed in a plurality of sharing zones, according to an embodiment.

FIG. 1 is a diagram of a graphical user profile view 100 including a plurality of information containers 102, 114 disposed in a plurality of sharing zones 104, 106, 108 displayed on a graphical display 110 of a user computing device 112, according to an embodiment. Each information container 102, 114 corresponds to a respective instance of information that may be shared or not, depending upon user preferences and user control of the graphical user profile view 100. According to an embodiment, each information container 102 corresponds to a charitable giving event.

In an embodiment, each charitable giving event corresponds to an instance of a user making a charitable donation using charitable giving software. In an embodiment, each charitable giving event corresponds to a charitable campaign. In an embodiment, each charitable giving event corresponds to a charitable organization. In an embodiment, each charitable giving event corresponds to an "award" given to the user responsive to a particular donation or to cumulative donation activity.

User privacy settings can be controlled through visually and spatially distinct sharing zones 104, 106, 108, where each zone may indicate a level of private, personal, or public access to information corresponding to a respective container 102, 114 contained within that zone.

A zone 108 on one end of the privacy spectrum can be completely public, another zone 104 on the other end of the spectrum completely private, with intermediary zones 106 in between indicating varying degrees of limited access to select other users within the system.

Information containers 102 (or "containers") can be representative of data, text, visual or graphic media, and other information types, such as but not limited to photos, videos, graphic or holographic images created with the intent of conveying information.

System sharing or privacy zones 104, 106, 108 (or "zones") can be regions of a user privacy control screen 110 that each correspond to a level of privacy to be maintained for respective containers 102 within each zone.

A computer network (or "network") allows devices to transmit information therebetween. For example, the network can be a multi-purpose, multi-user platform that allows users to access, view and share information that may be produced by the user or a group of users or generated by the system. In some embodiments, the network is characterized by a social media application that allows users (including "friends" and/or the public) to interact with one another via user public, "friend", or private screens. Each graphical zone 104, 106, 108 corresponds to a selected privacy setting for providing access to information represented by the containers 102 to others (or not). Privacy settings for information corresponding to respective containers 102 are established by positioning (e.g., dragging-and-dropping via a graphical user interface (GUI)), a selected container 102 within a selected zone 104, 106, 108.

Several sharing and privacy zones 104, 106, 108 can be defined in the system. Zones 104, 106, 108 can have different privacy settings. Each zone 104, 106, 108 can be global to the entire system and therefore available to every user in the system, or it can be opened to specific groups of system users or individual users. A zone 104, 106, 108 can have unique or shared properties with other zones in the system.

The system can be "restrictive" or "permissive" in nature, based on its intent and/or the system owners' preferences. In the "restrictive" system, information is presumed to be private unless stated otherwise. In the "permissive" system, the information is presumed to be sharable or public, unless stated otherwise. Users are made aware of the nature of the system upon sign-up and throughout their system use.

Zones 104, 106, 108 can be defined and adjusted by the administrators of the system. Over the lifetime of the system numerous zones 104, 106, 108 may be added or retired from the system. Zones 104, 106, 108 correspond to respective assigned privacy settings that determine the level to which information is available or restricted to access by other users within a system on a spectrum from completely public 108 (available to all system users) to completely restricted 104 (available only to the owner(s)/creator(s)/administrator(s) of the user account), with varying degrees of availability assigned to categories of users described within the system.

A zone 104, 106, 108 can have associative properties of the sharing and privacy settings it is assigned. The zone can maintain its properties throughout its lifecycle. Upon retirement of a zone, all information containers residing in the retired zone (not shown) can be assigned to either a more restrictive or a more permissive zone 104, 106, 108, based on the restrictive or permissive nature of the system.

Zones 104, 106, 108 can have visual and sensory identifiable properties, such as color, shape, size, and/or texture, as well as sound and haptic feedback. Similarly, information containers 102 can have visual and sensory identifiable properties such as color, shape, size, and/or texture, as well as sound and haptic feedback.

The system can enable several types of information containers 102. Information containers 102 or other visual components of the system can be updated with dynamically generated data. Information containers 102 may contain user generated or system-generated data.

Several types of information containers 102 may be classified as follows:
  a. Textual—information presented in textual, paragraphed form and containing a combination of symbols, characters, and numbers
  b. Analytical—analytical and transactional information, presented as numbers, trends and timelines; could be organized in a table, chart or graph form
  c. Visual—videos, photos, screen capture
  d. Graphical—graphical representation of an object or an abstract data, such as logos, badges, progress bars, embellishments, etc.
  e. Combination—information containers containing multiple information types Information containers 102 can be visually identified with visible properties, such as color, shape, size, and/or texture. They can also be identifiable through sensory interactive feedback to the users, such as but not limited to touch, sound, smell, or motion sensory mechanisms.

Information containers can adopt some or all visual and other properties of the zone they belong to.

Visual and sensory properties of the information containing objects can indicate the type or nature of the container or containers sharing level, depending on the specific system taxonomy established by system developers or administrators.

As indicated above, privacy and sharing preferences for information corresponding to a respective container 102 is controlled by selection of which zone 104, 106, 108 in which the container is placed.

Figure 2:
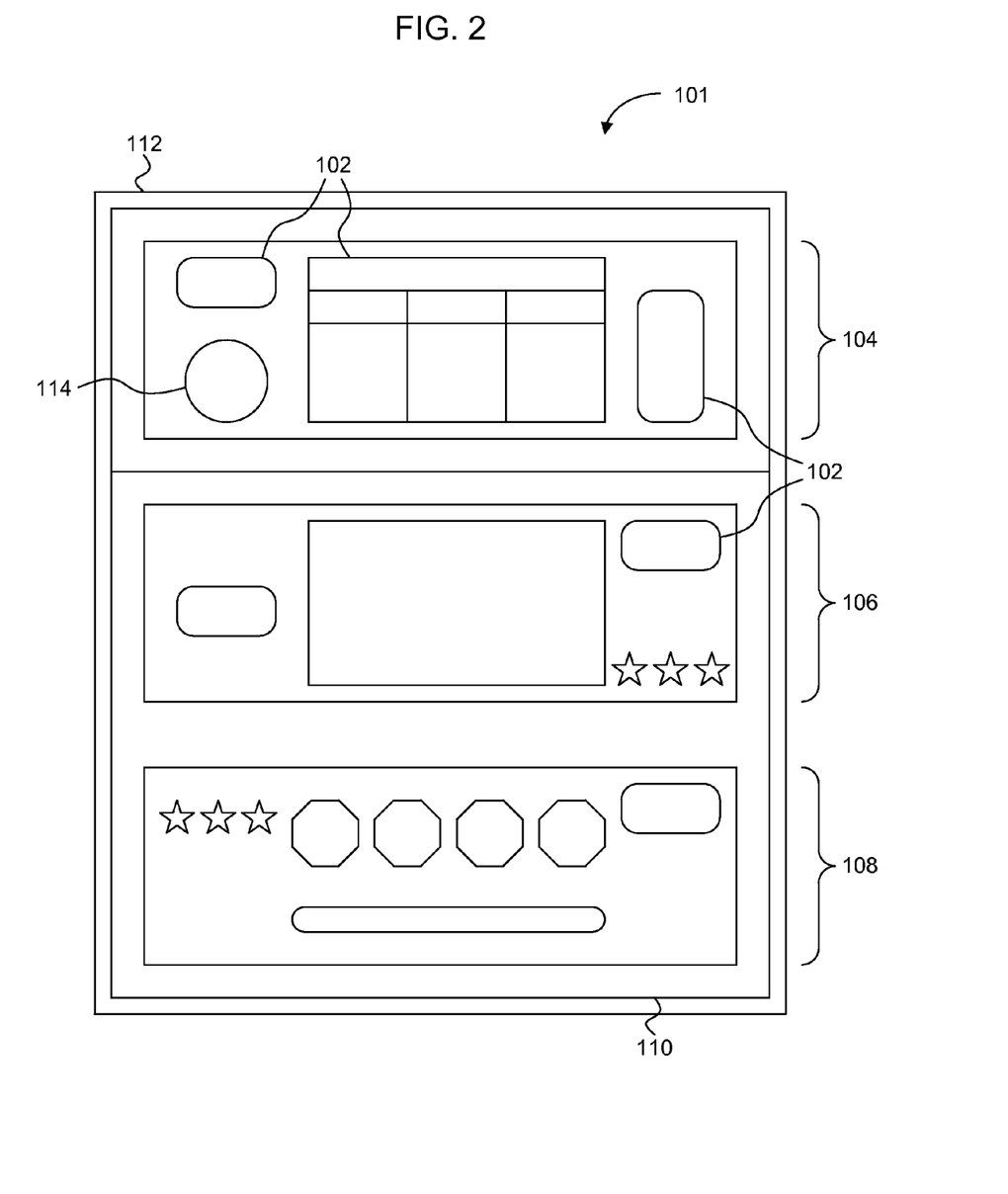
FIG. 2 is a diagram of the GUI of FIG. 1 after an information container was moved between zones, according to an embodiment.

FIG. 2 is a diagram of a graphical user profile view 101 corresponding to the view 100 of FIG. 1 wherein an information container 114 has been moved between zones, from zone 106 to zone 104, according to an embodiment. To control privacy settings for information corresponding to an information container 102, a user can move (drag-and-drop, for example) information containers into sharing zones 104, 106, 108 that designate their desired level of information sharing. As information containers move across zones they adopt privacy settings of the new zone they are moved into, which overwrites privacy settings of previous zones. Privacy settings corresponding to respective containers are automatically adjusted as each information container is moved between zones. In the example of FIGS. 1 and 2, the information container 114 was moved from a "friend-viewable" zone 106 to a "private" zone 104. Accordingly, a user screen or page previously loaded by a "friend" would include information corresponding to the information container 114. After movement of the container 114 from the friend-viewable zone 106 to the private zone 104, a user screen or page loaded by a loaded friend (a "friend" is defined as a second user to whom the user has granted privileges to view a page including information corresponding to containers located in zones 106 and 108), does not include the information corresponding to the container 114.

In some embodiments, the containers 102 can be formed as thumbnail or full scale views of the information represented by a respective container 102. In other embodiments, the containers 102 can be abstractions of information that will be visible at various privacy levels. For example, a musical track can be represented by a "musical note" icon, or by a thumbnail of album art. A photograph can be represented by a thumbnail of the photo itself, or can be represented by a photo album icon, for example. In embodiments where the containers 102 represent charitable giving events, the container can be in the form of a "gold star", an award ribbon, a logo for the charitable organization to which the donation was given, or other abstraction.

Figure 3:
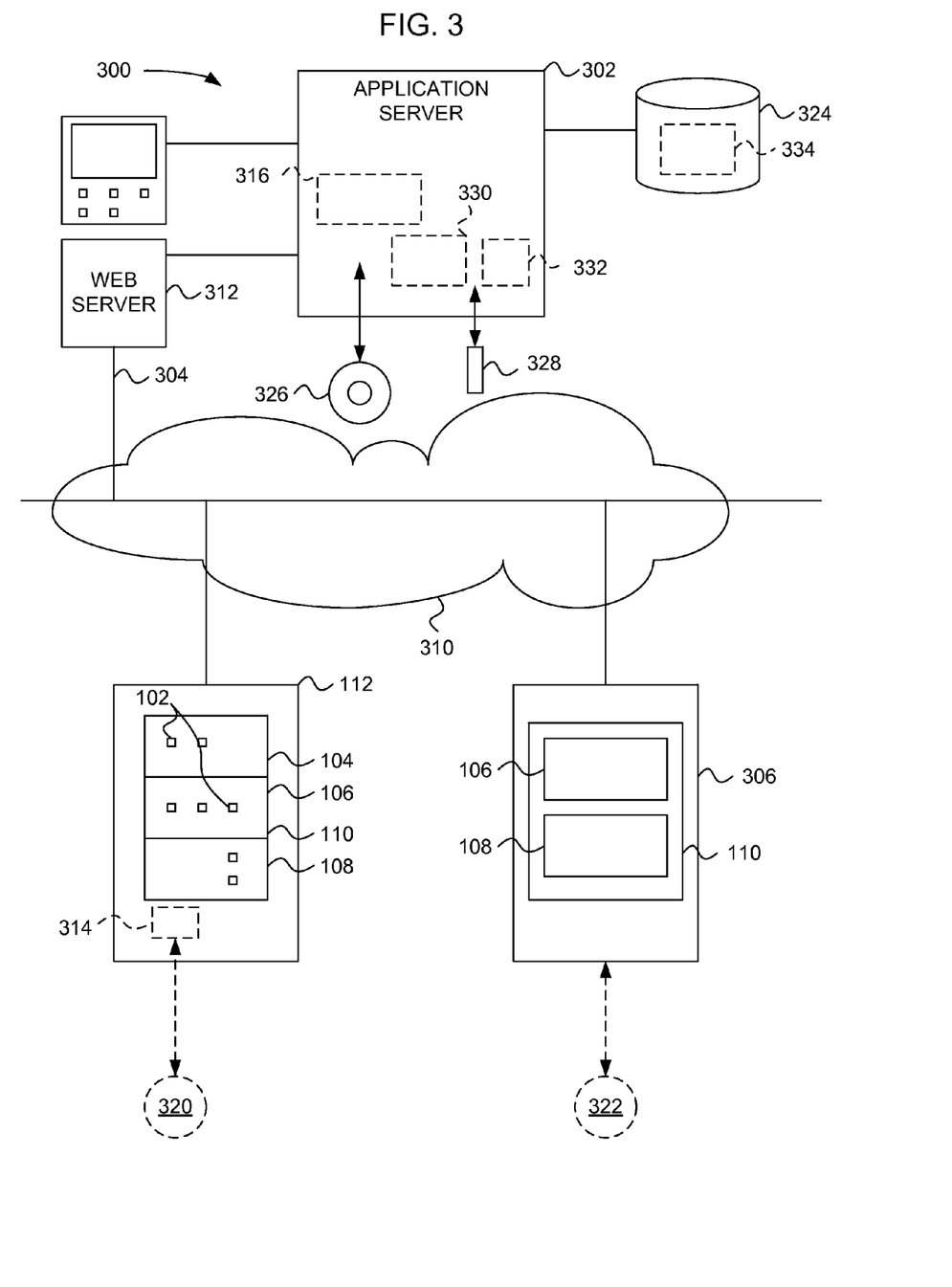
FIG. 3 is a block diagram of a computer system for using the GUI depicted in FIGS. 1 and 2, including various embodiments of non-transitory computer readable media for carrying computer instructions for operating the GUI, according to embodiments.

FIG. 3 is a block diagram of a system 300 for managing user privacy settings, according to an embodiment. At least one server computer 302 includes a network communication interface 304 configured for communication with other computers 306 including a user computing device 112 across a communication network 310. A web server 312 may be operatively coupled to the at least one server computer 302 and configured to interface with a client software application 314 running on the user computing device 112. An application 316 including a privacy settings application portion may be operatively coupled to the web server 312 and the client software application 314. As shown in the depiction of FIG. 3, the application 316 including the privacy settings application portion may be configured to run on the at least one server computer 302 and configured to communicate with the client software application 314 via the server computer network communication interface 304 and the network 310. For example, the application 316 including the privacy settings application portion may include an application that runs on an operating system of the server computer 302 that, in turn, communicates with the web server 312. The application 316 including the privacy settings application portion may include another application running on the operating system of the server computer 302. Alternatively, the application 316 including the privacy settings application portion may be configured as an application that runs on the web server 312, such as via an application programming interface (API) for the web server 312. The client software application 314 can be a web browser, for example. Alternatively, the client software application 314 can be a purpose-specific application configured to exchange data with the application 316 including the privacy settings application portion running on the server computer 302. Optionally, the client software application 314 and the server computer application 316 can be distributed portions of the same application.

In some embodiments, the application 316 including the privacy settings application portion can be a social networking application, and the privacy settings screen 110 described herein can be a portion of the social networking application. In one embodiment, the plurality of privacy zones 104, 106, 108 can be portions of a social networking screen 110, and the containers 102 can be information posted by a user 320 or by "friends" 322 having posting authority on the user's social networking home screen. For example, the user 320 can see all zones 104, 106, 108, and therefore all containers posted across all zones including a private zone 104; third party users not known to the user can see only posted containers having locations in a "public" zone 108; and "friends" 322 granted sharing privileges can see containers in the public zone 108 and a friends zone 106, but not the private zone 104. Other combinations such as separate "friends" zones shared with separate groups of friends can be provided in some embodiments.

As may be seen in FIG. 3, a "friend" device 306 includes a display 110 showing the friends and public zones 106, 108. In some embodiments, the second device 306 sees the same information containers 102 shown on the user's computing device 112. In other embodiments, the second device 306 sees a representation of the underlying data associated with each container 102.

Various forms of non-transitory computer-readable media may carry instructions configured to cause a computer or computers to execute instructions corresponding to methods described herein. In one embodiment, the instructions may be carried on a disk drive 324 such as a rotating magnetic medium. In another embodiment, the instructions may be carried on an optical disc 326 for reading by an optical drive. In another embodiment, the instructions may be carried by a portable memory device 328 such as secure digital, compact flash, and/or a USB drive. In another embodiment, the instructions may be carried by an internal non-volatile (solid state) storage medium 330 or by random access memory 332.

Various approaches to using the system 300 of FIG. 3 are contemplated. For example, the application 316 including the privacy settings application portion may be configured to run on the user computing device 112, optionally as part of or substantially as the client software application 314. Alternatively, another embodiment (not shown) may include some portions of the application 316 including the privacy settings application portion being resident on the server computer 302 and other portions of the application 316 including the privacy settings application portion being resident on the user computing device 112. For the server-based privacy settings application architecture, the application 316 including the privacy settings application portion may operate on the same server computer 302 as the web server 312, or may alternatively be disposed on a different server computer 302.

Any of the non-transitory computer readable media can be configured to carry a data structure 334 that provides data corresponding to the information containers 102 and sharing zones 104, 106, 108.

The privacy settings application 316 can be configured to cooperate with the client software application 314 to receive movement commands for containers from a user 320 via a user interface, and to update a data structure 334 carrying at least metadata about information that each of the containers 102 represents.

Typically, the user 320 is a person different than a second user 322 to whom data corresponding to data containers disposed within a "shared" zone is intended to be displayed.

Figure 4:
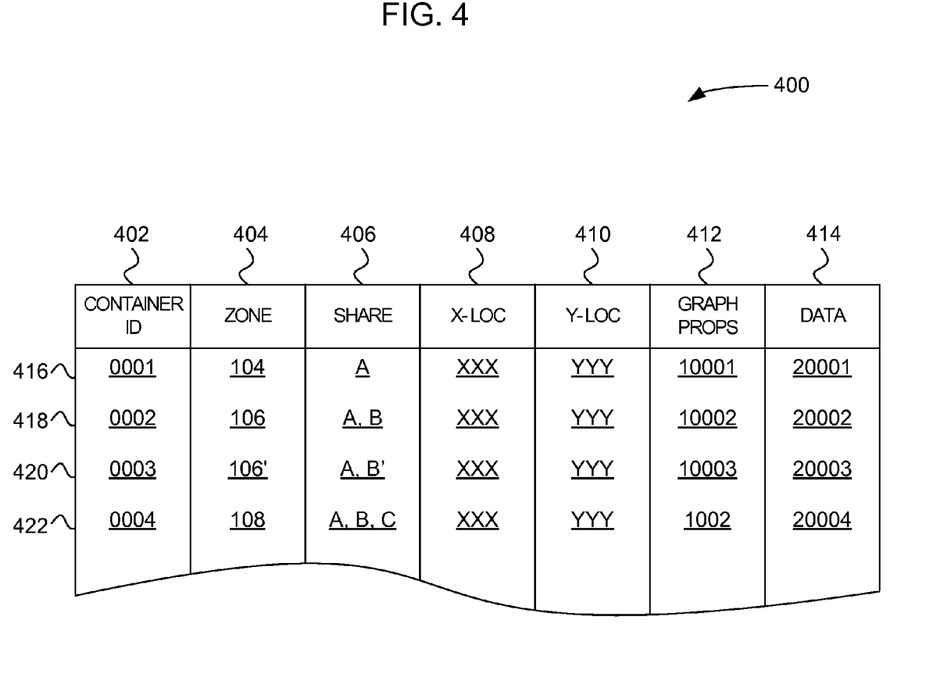
FIG. 4 is a diagram of a database record having a data structure corresponding to a container, and to a data structure carried by a non-transitory computer-readable medium.

FIG. 4 is a diagram of a data table 400 corresponding to a data structure 334 that provides data corresponding to the information containers 102 and sharing zones 104, 106, 108, according to an embodiment. The data can include privacy settings, privacy setting application data, container graphical data, corresponding privacy zone, display location within the privacy zone, and at least a reference to underlying data corresponding to each of the containers 102 shown in FIGS. 1 and 2. In the diagram of FIG. 4, the data structure 334 is shown as a database table 400. In practice, the system architect may choose to use a database to carry data, or may choose to use another form of addressable storage. For ease of understanding, the data structure 334 will be described as a database table 400.

In FIG. 4, each instance of respective data is assigned a container identification 402. Corresponding to each respective data, the table 400 displays a sharing zone 404 in which the container is disposed, a sharing privilege 406 corresponding to the zone, an x-location 408 of the container within the zone (e.g., expressed as an x pixel value (column) of an upper left corner of the container), a y-location 410 of the container within the zone (e.g., expressed as a y pixel value (row) of the upper left corner of the container), graphical properties 412 of the container, and data 414 corresponding to the container.

For example, the non-transitory computer readable medium can carry a data structure 334 including giving data 414 corresponding to a charitable giving event. The giving data can take several forms and can include both actual data and metadata about the charitable giving event. As shown in FIG. 4, the data structure 400 includes the field 414 having respective data addresses or filenames where the charitable giving data is located. For example, a first instance 416 points to a charitable giving data location of 20001, a second instance 418 points to a charitable giving data location 20002, a third instance 420 points to a charitable giving data location 20003, and a fourth instance 422 points to a charitable giving data location 20004.

Alternatively, the data table 400 can include literal charitable giving data rather than a reference to a storage location.

Charitable giving data can include, for example, an amount donated, a location of the donation, a source of the donation (e.g., internal to the application 316 vs. manually entered into the application 316), a date of donation, a time of donation, a charitable organization identity, a charitable campaign identity, a path to a "friend" who proposed or "paid forward" the donation, points associated with the donation, and/or points or value associated with cumulative charitable giving.

In embodiments related to instances other than charitable data instances, the data 414 can relate to other types of underlying data, described above in conjunction with FIG. 1.

Container graphical properties 412 are selected to affect the appearance of the first graphical container 102. For example, the appearance of each instance 416, 418, 420, 422 of containers to be displayed on a user device is controlled by respective container graphical properties, in this case saved at memory locations 10001, 10002, 10003, and 10002, respectively. Optionally, the table 400 can include literal graphical properties data rather than a reference to a storage location. In an embodiment, the storage location refers to a respective style sheet for each type of container.

In embodiments, each graphical container is intended to represent a respective charitable giving event.

A privacy zone identity 404 identifies the privacy in which the container resides, the privacy zone corresponding to a first displayed region on the user device, the displayed region being intended to represent a corresponding sharing privilege setting. The sharing privilege setting is intended to determine one or more identities of login credentials having access to the data, or at least to the container 102.

The table 400 can further include a location in the privacy zone selected as a display location of the graphical container. As shown, the location can include the x location 408 and the y-location 410. Optionally, the location coordinates 408, 410 can refer to a global location rather than a location within a given sharing zone 404.

Optionally, the container graphical properties 412 are selected as a function of a donation amount by a person having login credentials to view the graphical container. In another embodiment, the container graphical properties 412 are selected as a function of a charitable organization identity, the charitable organization having received a donation from a person having login credentials to view the graphical container. In another embodiment, the container graphical properties 412 are selected as a function of a charitable campaign identity, the charitable campaign having received a donation from a person having login credentials to view the graphical container. In another embodiment, the container graphical properties 412 include a graphical image of a logo of a charitable organization or charitable campaign. In another embodiment, the container graphical properties 412 include a digital photo. In another embodiment, the container graphical properties 412 include pixel colors corresponding to a donation amount.

The application 316 can be configured to automatically select container graphical properties 412 responsive to the data 414 and/or a class of the data 414.

Figure 5:
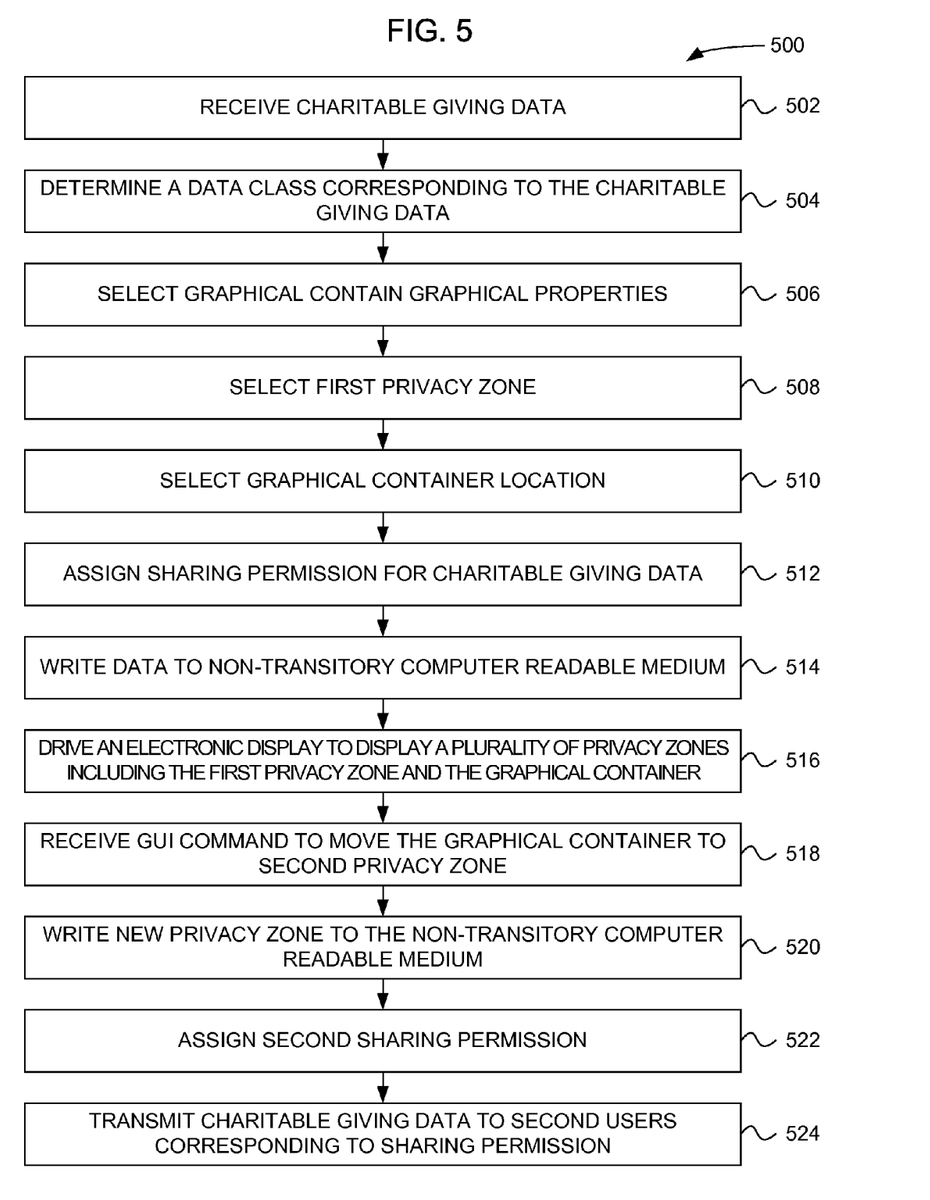
FIG. 5 is a flow chart showing a method for operating an end device or server computer shown in the system of FIG. 3 to use the GUI of FIGS. 1 and 2, according to an embodiment.

FIG. 5 is a flow chart showing a method 500 for operating an end device or server computer shown in the system of FIG. 3 to use the GUI of FIGS. 1 and 2, according to an embodiment. The method 500 for selected sharing of charitable giving events across a network includes, in step 502, receiving charitable giving data corresponding to a charitable giving event into computer memory. In one embodiment, step 502 includes receiving charitable giving transaction data from the user via a graphical user interface (GUI) displayed by a mobile charitable giving application. In this case, the charitable giving data corresponds to the charitable giving transaction data.

Charitable giving transaction data can include a user actuating a charitable giving program GUI, such as by pressing a "Donate" button. Various approaches to charitable giving applications are described in more detail in U.S. Non-Provisional patent application Ser. No. 14/217,171; entitled "SYSTEM AND METHOD FOR MAKING A CONTEXT-SENSITIVE DONATION"; filed Mar. 17, 2014; copending at the time of filing; which, to the extent not inconsistent with the description herein, is incorporated by reference.

Proceeding to optional step 504, the computer processor may determine a data class corresponding to the charitable giving data. For example, if the charitable giving data corresponds to a response to a charitable campaign, the computer processor may select a data class corresponding to a graphical element specific to the particular charitable campaign. In another example, if the charitable giving data indicates a large donation, the computer processor may select a data class corresponding to large donations. Large donations may be indicated by a special container graphical design. Additionally or alternatively the computer processor may select an initial privacy zone in which to deposit the graphical container as a function of data class.

In step 506, a computer processor selects container graphical properties corresponding to the charitable giving data (optionally as a function of data class). In some embodiments, the user can optionally input graphical properties via a GUI for selection by the computer processor.

Proceeding to step 508, the computer processor selects a first privacy zone from a plurality of privacy zones. The first privacy zone can be, for example, a default privacy zone such as "private" or an "in-box" privacy zone that delays sharing of the charitable giving data until the user moves the graphical container to a desired privacy zone via a GUI. In step 510, the processor (optionally responsive to GUI input) selects a location for displaying the graphical container within the first privacy zone.

In some embodiments, the computer method includes step 512, wherein the processor assigns sharing permission to the charitable giving data, the sharing permission corresponding to the first privacy zone. In other embodiments, the sharing permission is encoded by the privacy zone, and sharing (or non-sharing) of the charitable giving data is performed by an external program.

Proceeding to step 514, the computer processor writes data including the charitable giving data, the container graphical properties, the first privacy zone identity, and the graphical container display location to a non-transitory computer-readable medium.

Step 516 includes driving an electronic display to display, to a user, a plurality of privacy zones including the first privacy zone and the graphical container at the location within the first privacy zone, the graphical container being displayed according to the container graphical properties.

If the user wishes to change the privacy setting, the method proceeds to step 518, wherein a command is received, from the user via a GUI, a graphical command to move the graphical container to a location within a second privacy zone. After step 518, the process proceeds to steps 520 and 522, wherein the processor assigns second sharing permission to the charitable giving data, the second sharing permission corresponding to the second privacy zone; and data corresponding to the second privacy zone identity and the second location within the second privacy zone are written to the non-transitory computer-readable medium. Step 520 can also include writing second sharing permission data to the non-transitory computer-readable medium, wherein the second sharing permission corresponds to the second privacy zone.

Proceeding to step 524, the charitable giving data is transmitted to second users corresponding to the current sharing permission. This can be the first sharing permission if the user did not move the graphical container to a second privacy zone, or the second sharing permission if the user did move the graphical container. For example, step 524 can include transmitting, via a network interface, at least a portion of the charitable giving data for display on a second computing device associated with a second user only if the sharing permission data allows transmission of the charitable giving data for viewing by the second user. If the current privacy zone corresponds to secret sharing permission, then the charitable giving data is not transmitted for display on the second computing device for viewing by the second user.

Referring to steps 504 and 506, the charitable giving data corresponding to a charitable giving event can correspond to a donation from the user to a charitable organization. Selecting, with a computer processor, container graphical properties corresponding to the charitable giving data can include selecting container graphical properties corresponding to a donation amount. In another embodiment, the charitable giving data corresponding to a charitable giving event can corresponds to a donation from the user to a charitable organization, and selecting, with a computer processor, container graphical properties corresponding to the charitable giving data can include selecting container graphical properties corresponding to the particular charitable organization. In another embodiment, the charitable giving data corresponding to a charitable giving event corresponds to a donation from the user during a particular charitable campaign, and selecting, with a computer processor, container graphical properties corresponding to the charitable giving data can include selecting container graphical properties corresponding to the particular charitable campaign.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for selected sharing of charitable giving events across a network, comprising:
   receiving charitable giving data corresponding to a charitable giving event into computer memory;
   selecting, with a computer processor, container graphical properties corresponding to the charitable giving data;
   selecting, with the computer processor, a first privacy zone identity from a plurality of privacy zones;
   assigning, with the computer processor, sharing permission to the charitable giving data, the sharing permission corresponding to the first privacy zone;
   selecting, with the computer processor, a location within the first privacy zone for displaying the graphical container;
   writing data including the charitable giving data, the container graphical properties, the first privacy zone identity, and the location to a non-transitory computer-readable medium;
   driving an electronic display to display, to a user, a plurality of privacy zones including the first privacy zone and the graphical container at the location within the first privacy zone, the graphical container being displayed according to the container graphical properties;
   transmitting, via a network interface, at least a portion of the charitable giving data for display on a second computing device associated with a second user only if the first sharing permission data allows transmission of the charitable giving data for viewing by the second user;
   receiving, via a graphical user interface (GUI), a graphical command to move the graphical container to a second location within a second privacy zone;
   assigning, with the computer processor, second sharing permission to the charitable giving data, the second sharing permission corresponding to the second privacy zone; and
   writing data corresponding to the second privacy zone identity and the second location within the second privacy zone to the non-transitory computer-readable medium.

2. The method for selected sharing of charitable giving events across a network of claim 1, further comprising:
   receiving charitable giving transaction data from the user via a graphical user interface (GUI) displayed by a mobile charitable giving application;
   wherein the charitable giving data corresponds to the charitable giving transaction data.

3. The method for selected sharing of charitable giving events across a network of claim 1, further comprising:
   determining, with the computer processor, a data class corresponding to the charitable giving data;
   wherein selecting the container graphical properties corresponding to the charitable giving data includes selecting container graphical properties corresponding to the data class.

4. The method for selected sharing of charitable giving events across a network of claim 1, wherein the charitable giving data corresponding to a charitable giving event corresponds to a donation from the user to a charitable organization; and
   wherein selecting, with a computer processor, container graphical properties corresponding to the charitable giving data includes selecting container graphical properties corresponding to a donation amount.

5. The method for selected sharing of charitable giving events across a network of claim 1, wherein the charitable giving data corresponding to a charitable giving event corresponds to a donation from the user to a charitable organization; and
   wherein selecting, with a computer processor, container graphical properties corresponding to the charitable giving data includes selecting container graphical properties corresponding to the particular charitable organization.

6. The method for selected sharing of charitable giving events across a network of claim 1, wherein the charitable giving data corresponding to a charitable giving event corresponds to a donation from the user during a particular charitable campaign; and
   wherein selecting, with a computer processor, container graphical properties corresponding to the charitable giving data includes selecting container graphical properties corresponding to the particular charitable campaign.

7. The method for selected sharing of charitable giving events across a network of claim 1, wherein the first privacy zone corresponds to secret sharing permission; and wherein the charitable giving data is not transmitted for display on the second computing device for viewing by the second user.

8. The method for selected sharing of charitable giving events across a network of claim 1, further comprising:
   writing second sharing permission data to the non-transitory computer-readable medium;
   wherein the second sharing permission corresponds to the second privacy zone.

9. A non-transitory computer-readable medium carrying computer instructions configured to cause a computer to execute a method for selected sharing of charitable giving events across a social network, the method comprising the steps of:
   receiving charitable giving data corresponding to a charitable giving event into computer memory;
   selecting, with a computer processor, container graphical properties corresponding to the charitable giving data;
   selecting, with the computer processor, a first privacy zone identity from a plurality of privacy zones;
   assigning, with the computer processor, first sharing permission to the charitable giving data, the first sharing permission corresponding to the first privacy zone;
   selecting, with the computer processor, a first location within the first privacy zone;
   writing data including the charitable giving data, the container graphical properties, the first privacy zone identity, and the first location to a non-transitory computer-readable medium;
   driving an electronic display to display, to a user, a plurality of privacy zones including the first privacy zone and a graphical container at the first location within the first privacy zone, the graphical container being displayed according to the container graphical properties; and
   transmitting, via a network interface, at least a portion of the charitable giving data for display on a second computing device associated with a second user only if the first sharing permission data allows transmission of the charitable giving data for viewing by the second user;
   receiving, via a graphical user interface (GUI), a graphical command to move the graphical container to a second location within a second privacy zone; and
   assigning, with the computer processor, second sharing permission to the charitable giving data, the second sharing permission corresponding to the second privacy zone; and
   writing data corresponding to the second privacy zone identity and the second location within the second privacy zone to the non-transitory computer-readable medium.

10. The non-transitory computer-readable medium carrying computer instructions of claim 9, further comprising:
    receiving charitable giving transaction data from the user via a graphical user interface (GUI) displayed by a mobile charitable giving application;
    wherein the charitable giving data corresponds to the charitable giving transaction data.

11. The non-transitory computer-readable medium carrying computer instructions of claim 9, further comprising:
    determining, with the computer processor, a charitable giving data class corresponding to the charitable giving data;
    wherein selecting the container graphical properties corresponding to the charitable giving data includes selecting container graphical properties corresponding to the charitable giving data class.

12. The non-transitory computer-readable medium carrying computer instructions of claim 9, wherein the charitable giving data corresponding to a charitable giving event corresponds to a donation from the user to a charitable organization; and
    wherein selecting, with a computer processor, container graphical properties corresponding to the charitable giving data includes selecting container graphical properties corresponding to a donation amount.

13. The non-transitory computer-readable medium carrying computer instructions of claim 9, wherein the charitable giving data corresponding to a charitable giving event corresponds to a donation from the user to a charitable organization; and
    wherein selecting, with a computer processor, container graphical properties corresponding to the charitable giving data includes selecting container graphical properties corresponding to the particular charitable organization.

14. The non-transitory computer-readable medium carrying computer instructions of claim 9, wherein the charitable giving data corresponding to a charitable giving event corresponds to a donation from the user during a particular charitable campaign; and
    wherein selecting, with a computer processor, container graphical properties corresponding to the charitable giving data includes selecting container graphical properties corresponding to the particular charitable campaign.

15. The non-transitory computer-readable medium carrying computer instructions of claim 9, wherein the first privacy zone corresponds to secret sharing permission; and
    wherein the charitable giving data is not transmitted for display on the second computing device for viewing by the second user.

16. A method for setting sharing privileges for charitable giving events across a social network, comprising:
    receiving charitable giving data corresponding to a charitable giving event into computer memory;
    selecting, with a computer processor, container graphical properties corresponding to the charitable giving data, the container graphical properties corresponding to a depiction of a graphical container representing the charitable giving event;
    selecting, with the computer processor, a first privacy zone identity from a plurality of privacy zones;
    assigning, with the computer processor, first sharing permission to the charitable giving data, the first sharing permission corresponding to the first privacy zone;
    selecting, with the computer processor, a first location within the first privacy zone, the first location corresponding to a display location of the graphical container;
    writing data including the charitable giving data, the container graphical properties, the first privacy zone identity, and the first location to a non-transitory computer-readable medium;
    receiving a request, via a network interface, for data corresponding to a permissions control screen from a user device;
    outputting, via the network interface, data including the first graphical container properties, first privacy zone identity and first location for display on the user device;

receiving, via the network interface, data corresponding to a user-selected change in the location of the graphical container to a second location within a second privacy zone;

writing the second location to the non-transitory computer readable medium; and assigning, with the computer processor, second sharing permission to the charitable giving data, the second sharing permission corresponding to the second privacy zone.

17. The method for setting sharing privileges for charitable giving events across a social network of claim 16, further comprising:

transmitting, via a network interface, at least a portion of the charitable giving data for display on a second computing device associated with a second user only if the first sharing permission data allows transmission of the charitable giving data for viewing by the second user.

18. A non-transitory computer-readable medium carrying computer instructions configured to cause a computer to execute a method for selected sharing of charitable giving events across a social network, the method comprising the steps of:

receiving charitable giving data corresponding to a charitable giving event into computer memory;

selecting, with a computer processor, container graphical properties corresponding to the charitable giving data, the container graphical properties corresponding to a depiction of a graphical container representing the charitable giving event;

selecting, with the computer processor, a first privacy zone identity from a plurality of privacy zones;

assigning, with the computer processor, first sharing permission to the charitable giving data, the first sharing permission corresponding to the first privacy zone;

selecting, with the computer processor, a first location within the first privacy zone, the first location corresponding to a display location of the graphical container;

writing data including the charitable giving data, the container graphical properties, the first privacy zone identity, and the first location to a non-transitory computer-readable medium;

receiving a request, via a network interface, for data corresponding to a permissions control screen from a user device;

outputting, via the network interface, data including the first graphical container properties, first privacy zone identity and first location for display on the user device;

receiving, via the network interface, data corresponding to a user-selected change in the location of the graphical container to a second location within a second privacy zone;

writing the second location to the non-transitory computer readable medium; and assigning, with the computer processor, second sharing permission to the charitable giving data, the second sharing permission corresponding to the second privacy zone.

19. The non-transitory computer-readable medium carrying computer instructions of claim 18, wherein the steps further comprise:

transmitting, via a network interface, at least a portion of the charitable giving data for display on a second computing device associated with a second user only if the first sharing permission data allows transmission of the charitable giving data for viewing by the second user.

* * * * *